US006625790B1

(12) United States Patent
Casebolt et al.

(10) Patent No.: US 6,625,790 B1
(45) Date of Patent: *Sep. 23, 2003

(54) METHOD AND APPARATUS FOR DETECTING THE TYPE OF INTERFACE TO WHICH A PERIPHERAL DEVICE IS CONNECTED

(75) Inventors: Mark W. Casebolt, Seattle, WA (US); Lord Nigel Featherston, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/409,683

(22) Filed: Oct. 1, 1999

Related U.S. Application Data

(63) Continuation-in-part of application No. 09/112,171, filed on Jul. 8, 1998, now Pat. No. 6,460,094.

(51) Int. Cl.$^7$ .................................................. G06F 9/45
(52) U.S. Cl. ............................... 716/8; 716/9; 716/10; 716/11
(58) Field of Search ..................... 716/4, 8; 712/1, 712/230; 710/8, 26, 63, 108, 262, 269, 305, 306; 379/142.15

(56) References Cited

U.S. PATENT DOCUMENTS

| 4,500,933 A | 2/1985 | Chan ........................... 360/69 |
| 4,785,469 A | 11/1988 | Joshi et al. .................. 375/110 |
| 5,043,938 A | 8/1991 | Ebersole ...................... 364/900 |
| 5,473,264 A | 12/1995 | Mader et al. .................. 326/30 |
| 5,481,696 A | 1/1996 | Lomp et al. ................. 395/500 |
| 5,548,782 A | 8/1996 | Michael et al. .............. 395/835 |
| 5,577,213 A | 11/1996 | Avery et al. ................. 395/280 |
| 5,612,634 A | 3/1997 | MacKenna ................... 326/62 |
| 5,644,790 A | 7/1997 | Li et al. ....................... 395/883 |
| 5,754,890 A | 5/1998 | Holmdahl et al. .......... 395/883 |
| 5,793,999 A | 8/1998 | Mori ............................ 395/309 |
| 5,828,905 A | 10/1998 | Rao ............................. 395/883 |
| 5,832,244 A | 11/1998 | Jolley et al. ................. 395/309 |
| 5,857,112 A | 1/1999 | Hashemi et al. ............ 395/828 |
| 5,928,347 A | 7/1999 | Jones .......................... 710/129 |
| 5,935,224 A | 8/1999 | Svancarek et al. ............ 710/63 |
| 6,006,295 A | 12/1999 | Jones et al. ................... 710/62 |
| 6,460,094 B1 * | 10/2002 | Hanson et al. ................. 710/8 |

FOREIGN PATENT DOCUMENTS

| EP | 0 860 781 A2 | 2/1998 |
| WO | WO 97/31386 | 8/1997 |
| WO | WO 97/17214 | 4/1999 |

OTHER PUBLICATIONS

Universal Serial Bus Specification, Rev. 1.1, Section 7.1.5: Device speed identification, pp. 113 and 114, Sep. 23, 1998.

* cited by examiner

Primary Examiner—Vuthe Siek
Assistant Examiner—Naum Levin
(74) Attorney, Agent, or Firm—Joseph R. Kelly; Westman, Champlin & Kelly, P.A.

(57) ABSTRACT

A peripheral device is connectable to a computer having one of a first interface and a second interface. The first interface communicates with the peripheral device over a differential data connection having a first data conductor and a second data conductor. The second interface communicates with the peripheral device over a clock conductor and a single ended data connection which includes a data conductor. The peripheral device includes an interface detection component coupled to at least one of first and second communication conductors used to communicate between the peripheral device and the computer. The interface detection component is configured to detect which of the first and second interfaces the peripheral device is connected to.

33 Claims, 7 Drawing Sheets

METHOD AND APPARATUS FOR DETECTING THE TYPE OF INTERFACE TO WHICH A PERIPHERAL DEVICE IS CONNECTED

REFERENCE TO CO-PENDING APPLICATION

The present application is a continuation-in-part of pending U.S. patent application Ser. No. 09/112,171, filed Jul. 8, 1998 now U.S. Pat. No. 6,460,094 entitled "METHOD AND APPARATUS FOR DETECTING THE TYPE OF INTERFACE TO WHICH A PERIPHERAL DEVICE IS CONNECTED" and assigned to the same assignee as the present application, and which is hereby incorporated by reference.

BACKGROUND OF THE INVENTION

The present invention relates to a peripheral device connectable to a computer. More particularly, the present invention relates to a peripheral device configured to detect the type of interface to which it is connected.

A wide variety of peripheral devices are currently configured to be connectable to computers. Such peripheral devices commonly include user input devices, such as keyboards, point and click devices (traditionally referred to as a computer mouse) and other similar types of devices.

The computer to which such devices are connected communicates with the devices through one of a number of interfaces. Interfaces commonly used to connect to such peripheral devices include a serial interface (such as an RS232 interface) and a PS2 interface. Indeed, the PS2 interface has long been a standard for connecting keyboards and mice to computers.

However, recently, another serial interface referred to as a universal serial bus (USB) interface has been introduced. The USB interface accommodates a wide variety of computer peripherals, including, for example, keyboards and mice. However, a conventional computer is typically provided with only one interface (such as a PS2 or USB interface) for communication with peripheral devices. Therefore, if the computer is provided with a PS2 interface, the keyboard or mouse must be configured to support communication with the computer according to a protocol defined by the PS2 interface. Similarly, if the computer is provided with the USB interface, the keyboard or mouse must be configured to communicate according to a protocol defined by the USB interface.

In order to do this, a conventional computer peripheral device contains a microprocessor which runs a software program to carry out the functions of that particular peripheral device. In the device such as a keyboard or mouse, the software program includes an interface between the peripheral device and the host computer, through which the peripheral device communicates with the host computer. Such communication often includes receiving commands from the host computer and transmitting data and status information to the host computer.

As discussed above, the PS2 and USB interfaces have different hardware and software requirements, which must be met by the microprocessor in the peripheral device so that the peripheral device can communicate with the host computer. The PS2 interface uses two conductors which include a separate clock conductor and a separate data conductor. These conductors are driven by the computer through an open-collector or open-drain circuit, and have a pull-up resistor (typically in the range of 2 k ohms to 10 k ohms) pulling the conductor to a rail voltage (such as VCC) inside the host computer. The open-collector or open-drain circuit (commonly a transistor) is typically implemented inside the microprocessor. Another pull-up resistor is required inside the peripheral device as well. The peripheral device communicating over a PS2 interface is responsible for providing a clock signal on the clock conductor, regardless of the direction of data flow on the data conductor. The host computer pulls the clock conductor to a logic low level to inhibit communication from the peripheral device, and it can also pull the data conductor low to signal to the peripheral device that the host computer intends to transmit data to the peripheral device.

The USB interface also uses two conductors which include differential data signal conductors D+ and D−.

In the USB interface at the USB port (i.e., at the host computer or USB hub), the two conductors are pulled to a logic low level via 15 k ohm resistors. In the peripheral device, the D+ conductor is pulled to approximately 3.3 volts via a 1.5 k ohm resistor if the peripheral device is a high-speed USB peripheral device. The D− conductor is pulled to 3.3 volts via a 1.5 k ohm resistor if the peripheral device is a low-speed USB peripheral device. When a peripheral device is attached to the USB port, the USB host determines whether it is a low-speed or high-speed device by determining which of the D+ or D− conductors is pulled to the logical high level.

Thus, it can be seen that the two interfaces have different hardware structures, and communicate using different software protocols. Traditionally, separate peripheral devices have been provided, one being configured to communicate with a USB interface, and the other being configured to communicate with a PS2 interface. This requires the manufacturer of such peripheral devices to offer two different types of peripheral devices in order to support these two different interfaces.

SUMMARY OF THE INVENTION

The present invention defines a method and apparatus in the peripheral device such that the peripheral device can determine which type of interface it is connected to, and configure itself accordingly.

The peripheral device is connectable to a computer having one of a first interface and a second interface. The first interface communicates with a peripheral device over a differential data connection having a first data conductor and a second data conductor. The second interface communicates with the peripheral device over a clock conductor and a single-ended data connection, which includes a data conductor. The peripheral device has first and second communication conductors configured for connection to the first and second data conductors in the differential data connection and to the first data conductor in the single ended data connection and the clock conductor. The peripheral device includes an interface detection component configured to detect which of the first and second interfaces the peripheral device is connected to. The peripheral device also includes a controller component configured to communicate between the peripheral device and the computer according to a protocol corresponding to the detected interface.

DETAILED DESCRIPTION OF THE PREFERRED EMBODIMENTS

The present invention includes a method and apparatus, implemented in a peripheral device, by which the peripheral device detects whether it is coupled to a PS2 interface or a USB interface. A peripheral device, in accordance with one aspect of the present invention, is configured initially to expect a first interface and senses the state of the interface to configure itself appropriately.

Figure 1:
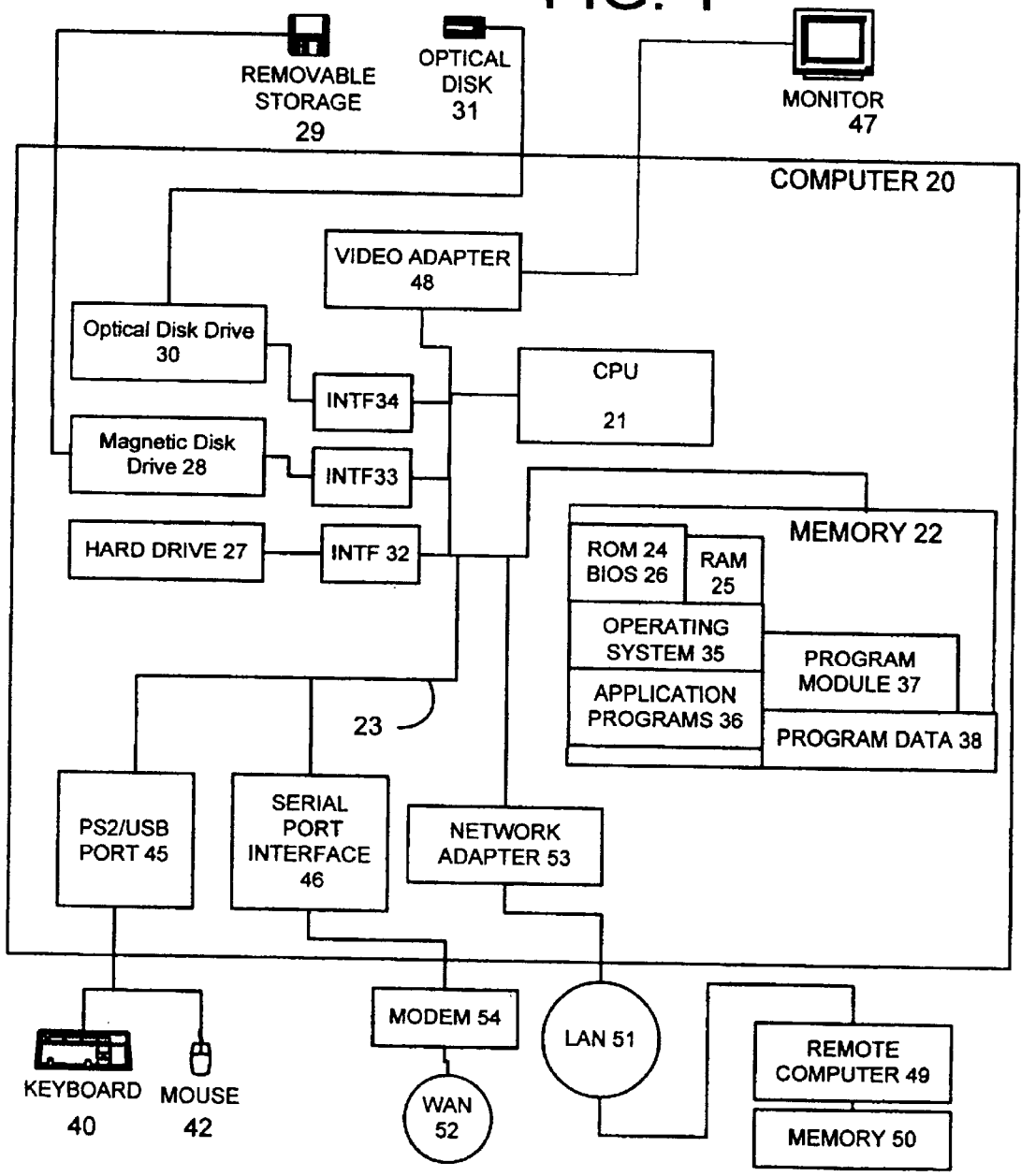
FIG. 1 is a block diagram of an exemplary environment in which an input device in accordance with the present invention can be used.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer or other computing device. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention is also applicable in distributed computing environments where tasks are performed by remote processing devices that are linked through a communications network. In a distributed computing environment, program modules may be located in both local and remote memory storage devices.

With reference to FIG. 1, an exemplary environment for the invention includes a general purpose computing device in the form of a conventional personal computer 20, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memory (RAM), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device (or mouse) 42. Other input devices (not shown) may include a microphone, joystick, game pad, satellite dish, scanner, or the like. These and other input devices are often connected to the processing unit 21 through one of a plurality of ports. For instance, keyboard 40 and mouse 42 are connected through a PS2 or USB interface 45. In the illustrative embodiment, interface (or port) 45 is coupled to the system bus 23. User input devices may also be connected by other interfaces, such as a sound card, a parallel port, or a game port. A monitor 47 or other type of display device is also connected to the system bus 23 via an interface, such as a video adapter 48. In addition to the monitor 47, personal computers may typically include other peripheral output devices such as speakers and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

Figure 2A:
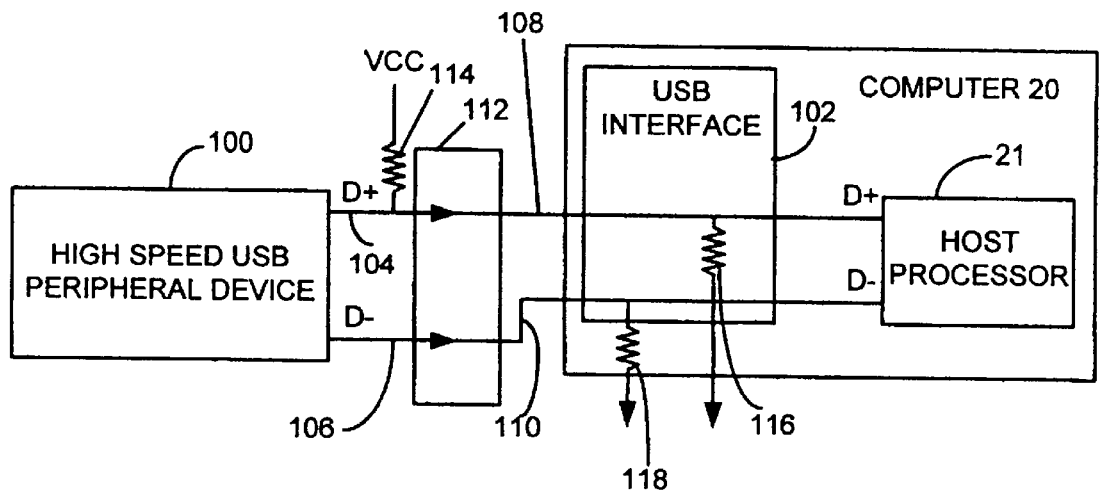
FIGS. 2A–2C illustrate conventional high-speed and low-speed USB peripheral devices and a PS2 peripheral device coupled to a USB interface and a PS2 interface, respectively.
Figure 2B:
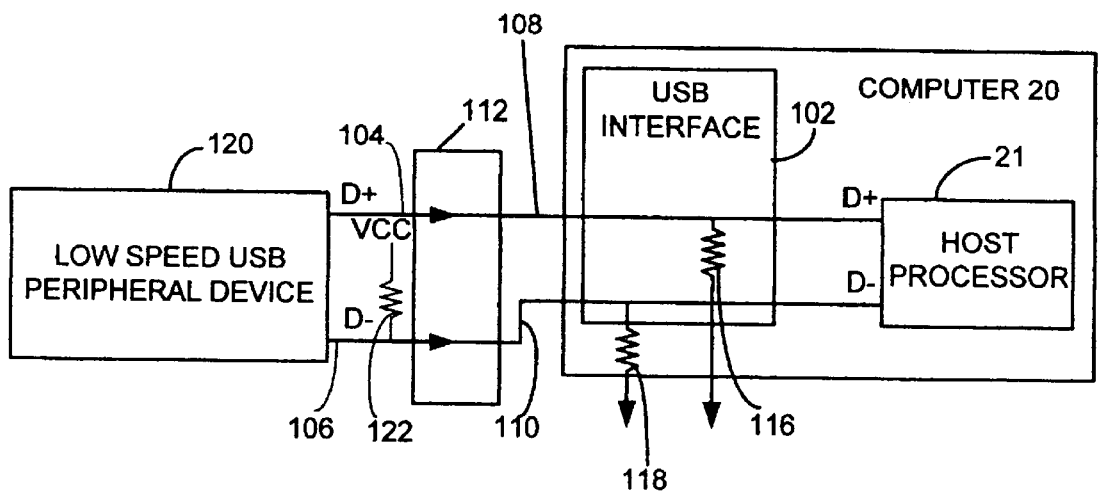
Figure 2C:
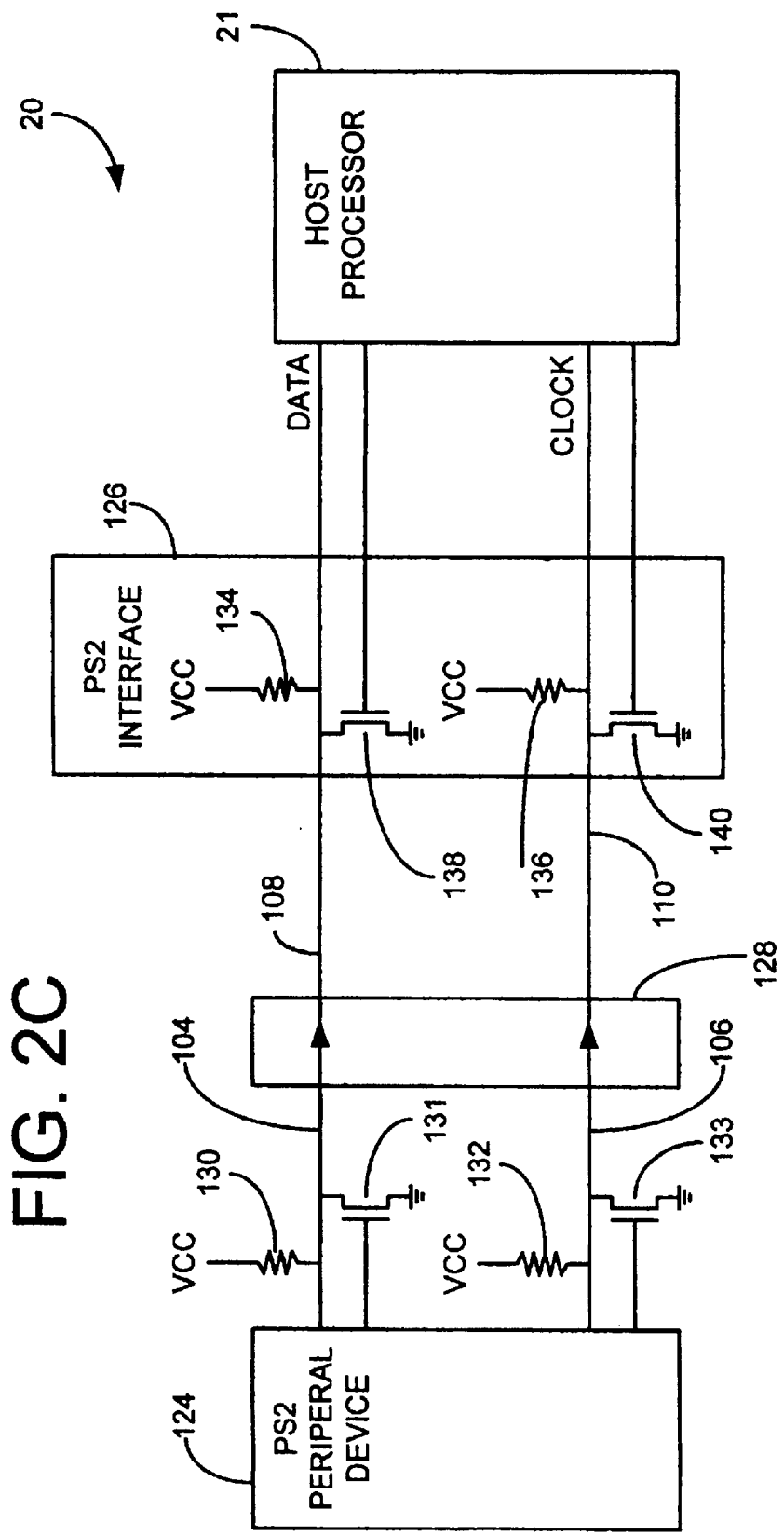

FIGS. 2A–2C illustrate conventional peripheral devices coupled to conventional interfaces. FIG. 2A illustrates a high-speed USB peripheral device 100 connected through USB interface 102 to CPU 21 of host computer 20. It should be noted that high-speed USB peripheral device 100 can be any suitable peripheral device, such as keyboard 40 or mouse 42 or another suitable peripheral device. Peripheral device 100 is connected to USB interface 102 and communicates therewith over two conductors 104 and 106. Conductors 104 and 106 are connected to corresponding conductors 108 and 110 through USB connector 112.

Conductors 104 and 106 carry signals denoted D+ and D− in a high-speed USB device. Signals D+ and D− are differential digital data signals with which peripheral device 100 communicates with computer 20.

In a high-speed USB arrangement, conductor 104, which carries signal D+, is pulled to a logical high level (such as a +5 Volt supply or other desired supply voltage potential hereinafter referred to as VCC or the VCC rail) by a pull-up resistor 114. Resistor 114 is preferably valued such that the voltage potential to which conductor 104 is pulled is approximately 3.3 volts. Therefore, resistor 114 can, for instance, be a 7.5 k ohm resistor connected to a 5 volt VCC rail.

In USB interface 102 on computer 20, both conductors 108 and 110 (which correspond to the D+ and D− signals) are pulled to a logic low level by two 15 k ohm resistors 116 and 118. When peripheral device 100 is initially attached to computer 20 through USB interface 102, computer 20 can determine that peripheral device 100 is a high-speed USB peripheral device because the conductor 104 corresponding to signal D+ is pulled to a logical high level, while conductor 106 which corresponds to signal D− is not.

FIG. 2B illustrates the connection of a low-speed USB peripheral device 120 to computer 20. Some items are similar to those shown in FIG. 2A, and are similarly numbered. However, rather than having conductor 104 (corresponding to signal D+) pulled to a logical high level with resistor 114, conductor 106 (which corresponds to signal D−) is pulled to a logical high level with resistor 122. Thus, computer 20 determines that peripheral device 120 is a low-speed USB device.

FIG. 2C illustrates another peripheral device 124 connected to computer 20. Peripheral device 124 is configured to communicate with computer 20 through a PS2 interface 126. PS2 peripheral device 124 communicates with computer 20 over a pair of conductors 104 and 106, which correspond to a data signal and a clock signal. Conductors 104 and 106 are connected to transistors 131 and 133, which are configured as open-collector or open-drain switches controlled by the microprocessor in peripheral device 124. Conductors 104 and 106 are connected to conductors 108 and 110 through PS2 connector 128. Conductors 104 and 106 are pulled to a logical high level at peripheral device 124 by resistors 130 and 132 which are typically in a 2 k–10 k ohm range.

In PS2 interface 126, conductors 108 and 110 are also pulled to a logical high level by resistors 134 and 136, which are also typically in a 2 k–10 k ohm range. Conductors 108 and 110 are also coupled to ground by transistors 138 and 140, which are typically open-drain or open-collector and driven by appropriate circuitry in processor 21. It should also be noted that transistors 138 and 140 can typically be implemented inside processor 21, or discretely.

With the open-collector configured interface, when a logical 1 is written to either conductor 108 or 110, the conductor is not actively driven high. Instead, it is pulled high, to nearly the rail voltage VCC, via the pull-up resistors 134 and 136. In this manner, either host processor 21 or peripheral device 124 can drive the conductor low without the concern of the conductor already being actively driven high.

Peripheral device 124 is responsible for providing the clock signal over conductors 106 and 110, to host processor 21, regardless of the direction of data flow over conductors 104 and 108. Host processor 21 can pull the conductor 110 carrying the clock signal low by controlling transistor 140 appropriately. This inhibits communication from peripheral device 124. Host processor 21 can also pull the data conductor 108 low by manipulating transistor 138 in order to signal peripheral device 124 that host processor 21 intends to transmit data.

Figure 3:
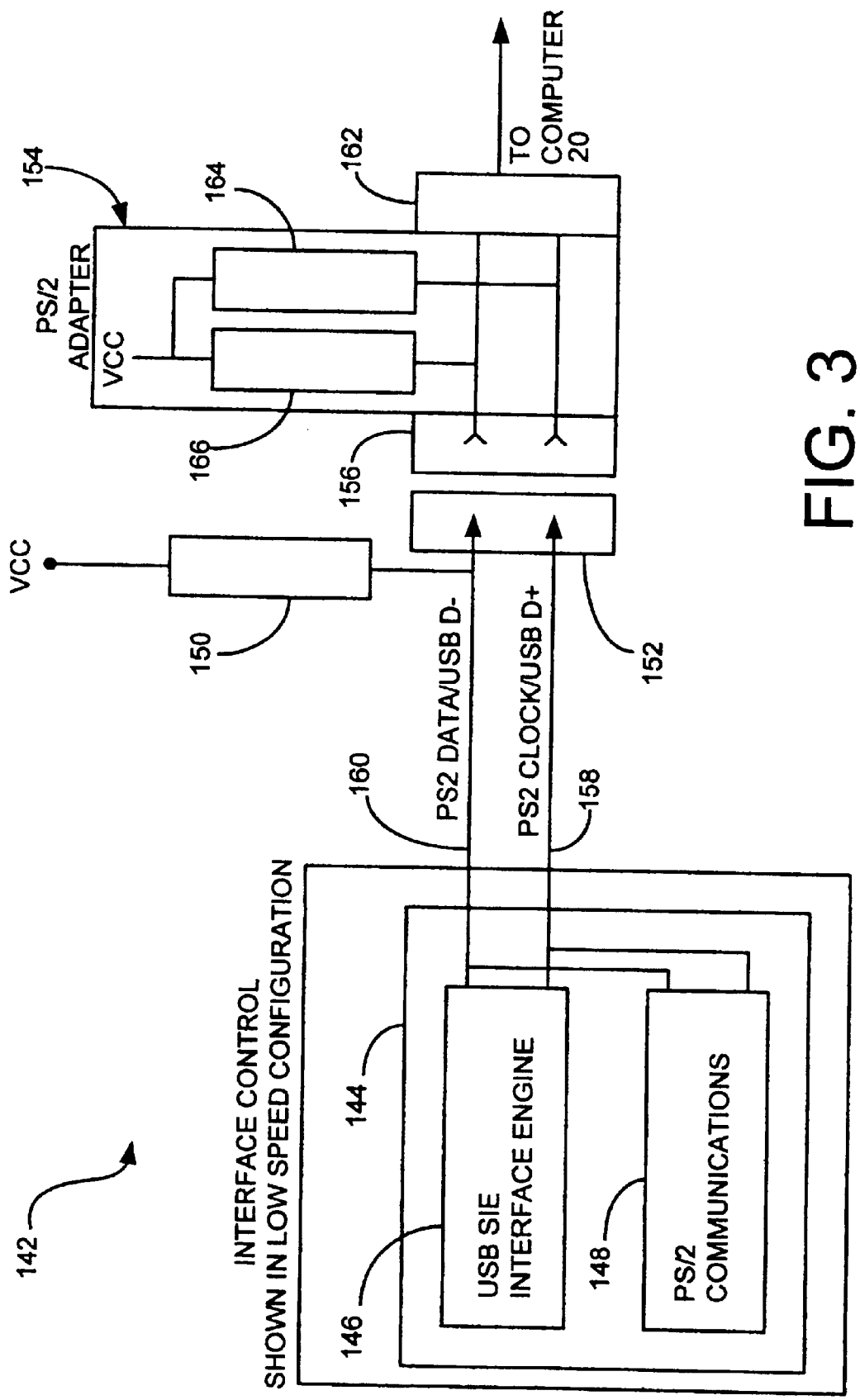
FIG. 3 illustrates a peripheral device in accordance with one embodiment of the present invention.

FIG. 3 illustrates a peripheral device 142 in accordance with one embodiment of the present invention. Peripheral device 142 includes a communication controller 144 which, in turn, includes a USB SIE interface engine 146 and a PS2 communications controller 148. Peripheral device 142 also, in one illustrative embodiment, includes pull-up resistor 150 which pulls the PS2 data/USB D− signal line to a predetermined voltage potential (such as VCC). Peripheral device 142 also includes, in one illustrative embodiment, a cable with USB connector 152.

It should be noted that, in FIG. 3, the PS2 data and USB D− lines are indicated as being carried by signal line or conductor 160 while the PS2 clock and USB D+ signals are indicated as being carried by conductor 158. Of course, the USB D+ signal can be carried by the same conductor as the PS2 data signal and the USB D− signal can be carried by the same conductor as the PS2 clock signal. Also, while pull-up resistor 150 is shown coupled to conductor 160 (which corresponds to the USB D− signal), it could also be coupled to the conductor which corresponds to the USB D+ signal where the USB device is a high speed device, rather than a low speed device. However, the present discussion will proceed with respect to the embodiment illustrated in FIG. 3, for the sake of simplicity.

FIG. 3 further illustrates a PS2 adapter 154 in accordance with one embodiment of the present invention. Adapter 154 includes a USB connector 156 which mates with USB connector 152. Adapter 154 connects the signal lines 158 and 160 to an output connector 162 which is suitable for being coupled to a connector or cable from computer 20. In one illustrative embodiment, connectors 152 and 156 are implemented as a USB series A plug and receptacle, respectively. Connector 162 is implemented as a PS2 mini-din connector.

Adapter 154, in the illustrative embodiment, also includes a pair of pull-up resistors 164 and 166. When adapter 154 is coupled to peripheral device 142, pull-up resistor 164 pulls the PS2 clock/USB D+ signal line to VCC. Resistor 166 pulls the PS2 data/USB D− signal line to VCC as well. The pull-ups in adapter 154 eliminate the necessity for the microprocessor on peripheral device 142 to control these dynamically. This saves firmware code space and also reduces necessary pin count on the microprocessor by one or two pins. This provides a significant cost savings.

Table 1 below illustrates the configuration of the two signals provided by both USB and PS2 devices. Table 1 illustrates the signals for a USB low speed device.

TABLE 1

| I/O State | D+/CLK | D−/DAT | USB | PS/2 |
|---|---|---|---|---|
| 0 | L | L | SE0 (Single Ended O) or Reset | Host Inhibit |
| 1 | L | H | J, Idle | Host Inhibit |
| 2 | H | L | K, Xmit Resume | Host Xmit |
| 3 | H | H | SE1 | Idle, |

TABLE 1-continued

| I/O State | D+/CLK | D−/DAT | USB | PS/2 |
|---|---|---|---|---|
| | | | (Single Ended 1) | Confirm Connect |

Figure 4:
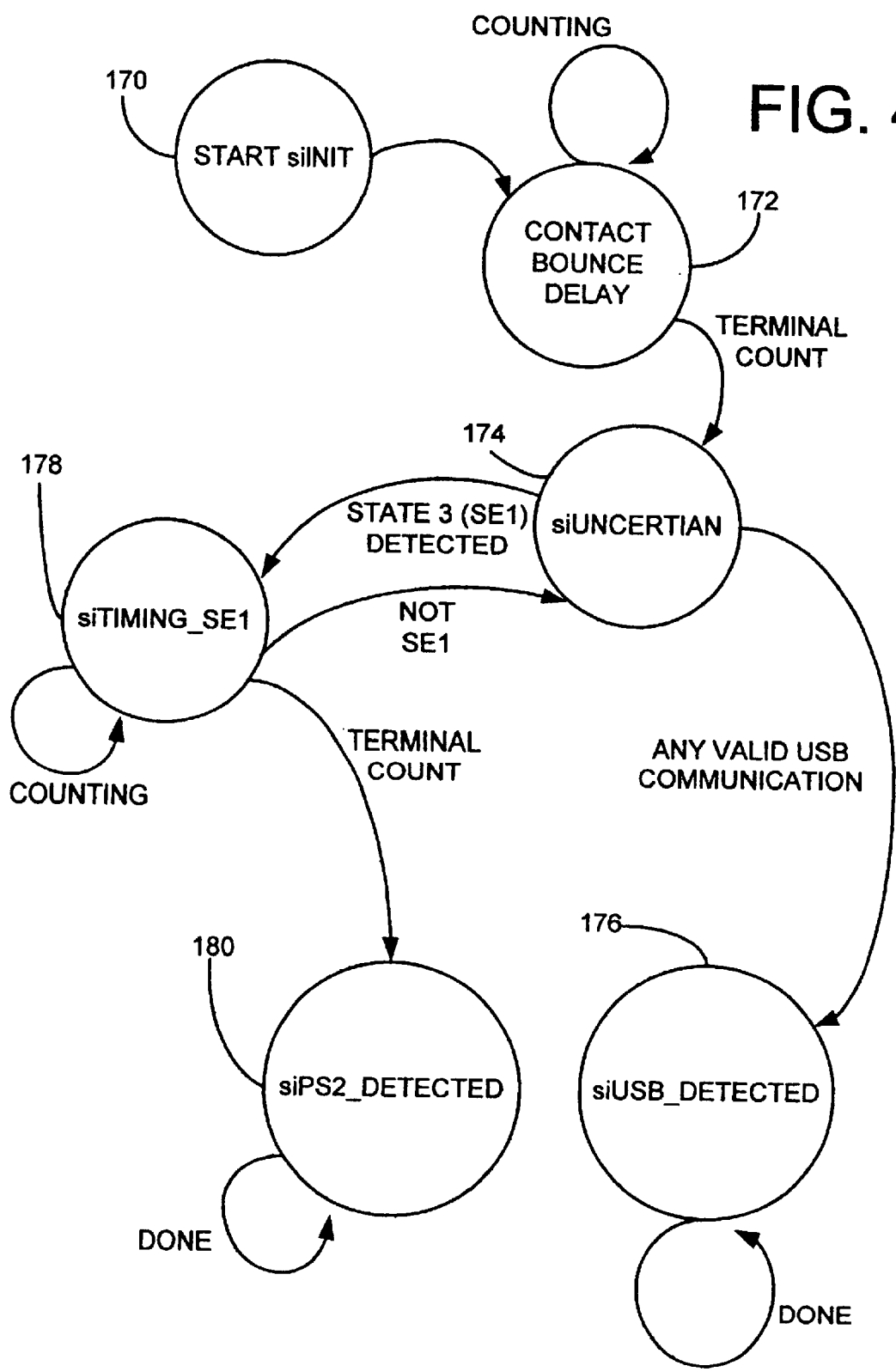
FIG. 4 is a state diagram illustrating the operation of the peripheral device shown in FIG. 3.

FIG. 4 is a state diagram illustrating the operation of peripheral device 142 shown in FIG. 3 and will be described with reference to FIG. 3 and Table 1. Communication controller 144 begins by starting the initialization process, as indicated by state 170 in FIG. 4. After power-up, communication controller 144 waits for a time-out period (such as 10–100 milliseconds). This allows time for contact bounce during mating of the connectors illustrated in FIG. 3. This is indicated by state 172 in FIG. 4.

After reaching the designated time-out period, communication controller 144 enters an indeterminate state 174. In the indeterminate state, controller 144 "assumes" that it is connected to a USB interface. In other words, controller 144 is configured to receive a valid USB communication, or USB reset signaling. In the event that controller 144 is in the indeterminate state 174 and receives valid USB 1.0 or 1.1 communications, controller 144 determines that it has detected a USB interface and moves to state 176. The USB interface engine 146 in controller 144 then takes over communications between peripheral device 142 and computer 20.

In the indeterminate state 174, controller 144 also periodically polls for the presence of a PS2 interface by monitoring the state of signal lines 158 and 160. In one specific embodiment, controller 144 looks for I/O state 3 in Table 1 (or the SE1 condition) on signal lines 158 and 160. If such a condition is detected, controller 144 moves to state 178 and determines whether the SE1 condition is detected for a sufficient time period (such as in excess of three milliseconds). If not, control reverts back to indeterminate state 174.

However, if the SE1 condition is maintained for the necessary time period, and the terminal count is reached, controller 144 determines that it has detected a PS2 interface and moves to state 180. This causes USB functions to be terminated, and PS2 communications controller 148 takes over communication between peripheral device 142 and computer 20. It will be noted that in this case, PS2 adapter 154 will be plugged into peripheral device 142 and computer 20. Thus, pull-up resistors 164 and 166 are present on both signal lines 158 and 160. Therefore, as long as the host computer 20 is not inhibiting the device communications (by holding one or both of the clock and data lines low), the interface is immediately identified as a PS2 interface, and communications are implemented according to the PS2 specification.

The embodiment illustrated in FIGS. 3 and 4 has a number of advantages. No external USB pull-up resistors are required. Instead, resistor 150 is simply hard wired to VCC. This allows the elimination of pull-up resistor control, and reduces pin count. Similarly, since the PS2 adapter 154 provides pull-up resistors 164 and 166, no internal control is required for PS2 pull-up resistors. This results in fewer components in the peripheral device controller. This also renders the device simpler and less costly. Similarly, this embodiment provides immediate conformance and response to USB 1.1 interface signaling requirements.

It has been found that the above embodiment works very well on a vast majority of host computers. However, some computers were discovered to hold PS2 interface communication lines in an inhibited state for extensive periods of time, even on power-up. This can make it difficult to detect and respond to initial communication sequences in a timely manner. Similarly, where a peripheral device 142 is "hot plugged" into the host computer, the inhibition of the PS2 communication by the host computer can make it difficult for the detection system discussed above to make an immediate detection.

Figure 5:
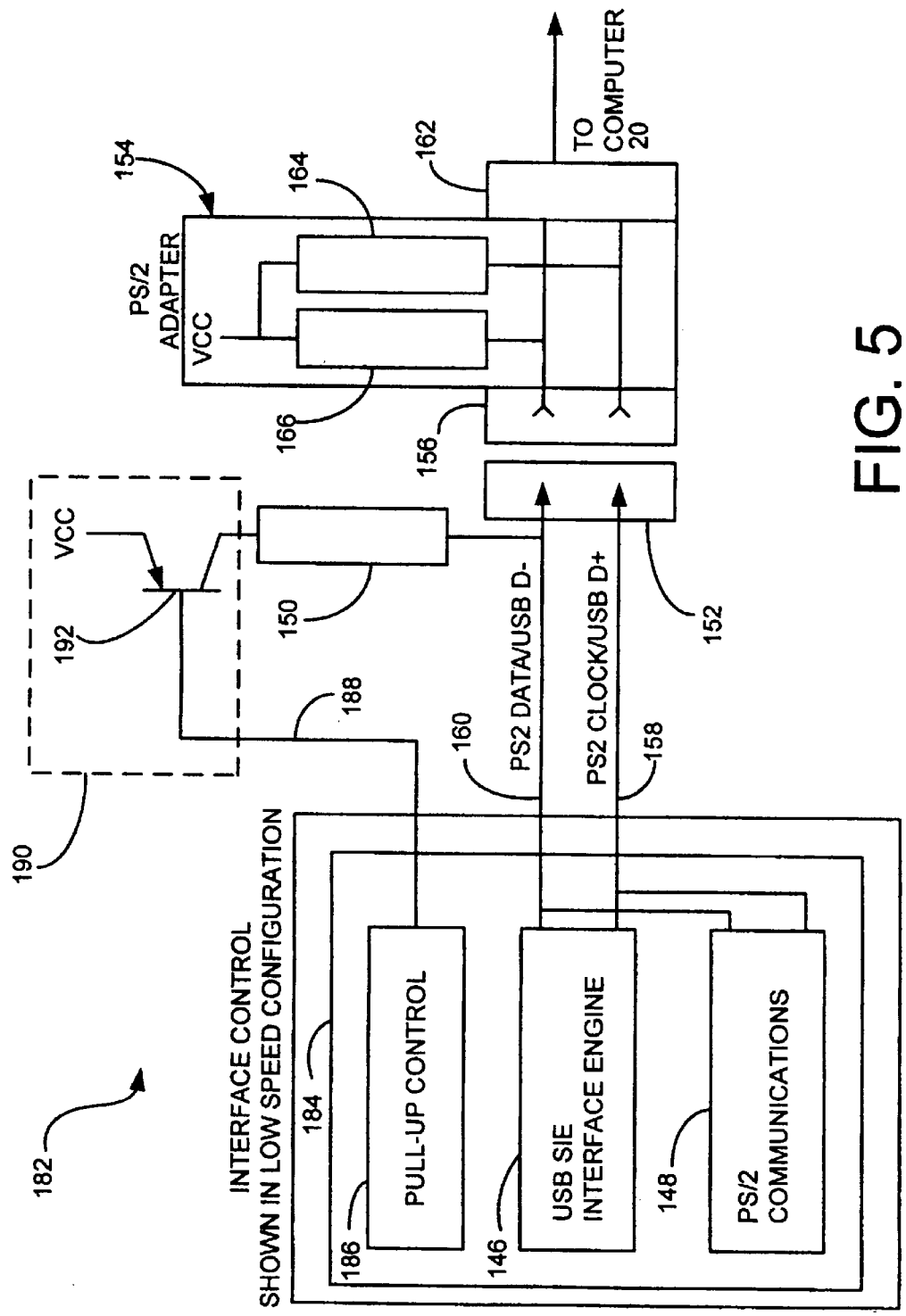
FIG. 5 is a block diagram of a peripheral device in accordance with another embodiment of the present invention.

Therefore, the present invention can be implemented according to a second embodiment as well. FIG. 5 illustrates peripheral device 182 which is implemented in accordance with a second illustrative embodiment of the present invention. A number of the items illustrated in FIG. 5 are similar to those found in FIG. 3, and are similarly numbered. However, in the embodiment illustrated in FIG. 5, peripheral device 182 includes communication controller 184 which not only includes USB interface engine 146 and PS2 communications component 148, but also includes resistor pull-up control component 186. Control component 186 provides an output 188 to a switch 190.

In the embodiment illustrated in FIG. 5, switch 190 is implemented as a bi-polar transistor 192 which is coupled between pull-up resistor 150 and a predetermined voltage potential (in this case VCC). This provides control component 186 with the ability to either enable pull-up resistor 150 by connecting pull-up resistor 150 to VCC, or to disable pull-up resistor 150, by effectively disconnecting pull-up resistor 150 from VCC.

Figure 6:
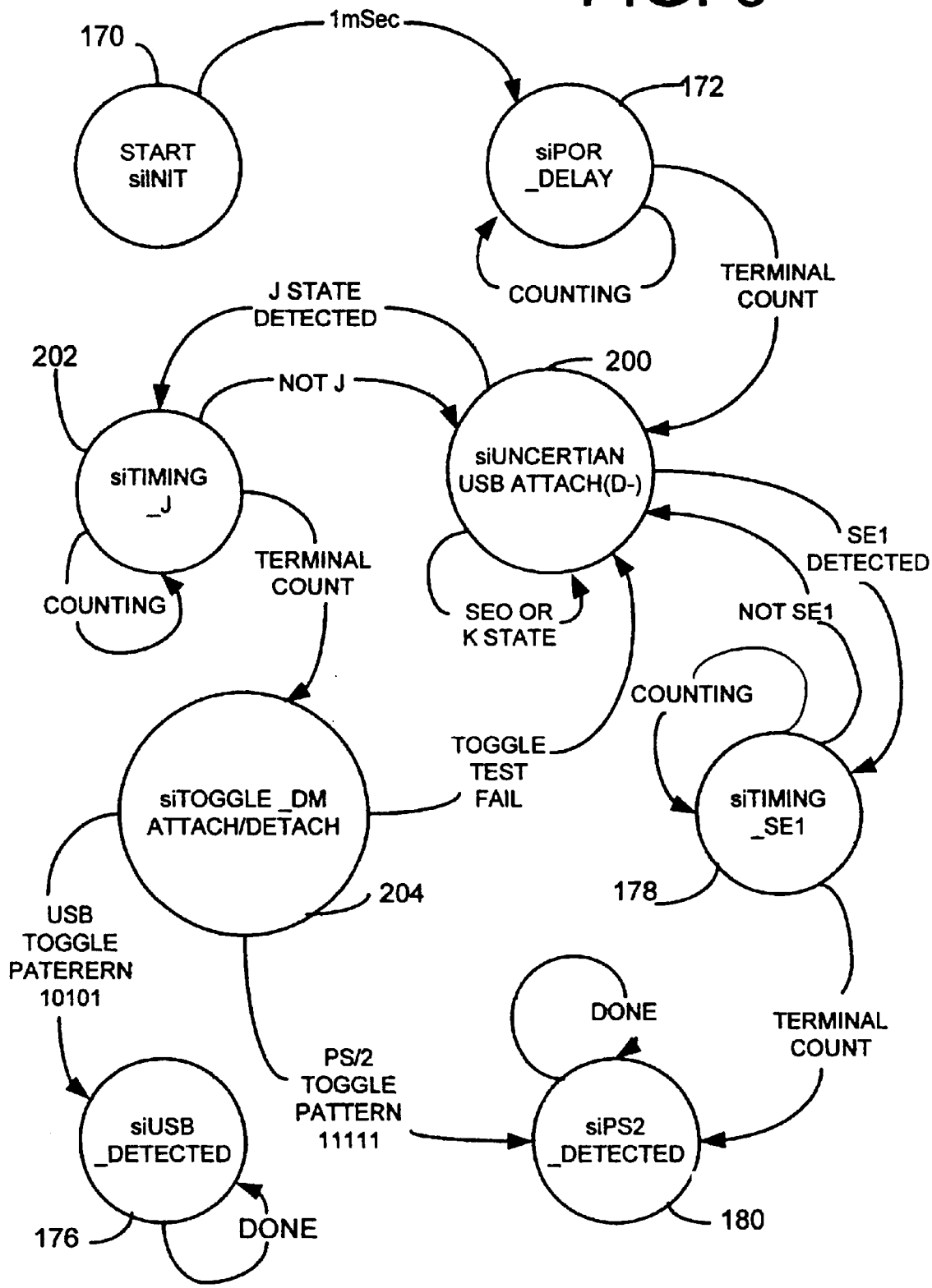
FIG. 6 is a state diagram illustrating the operation of the peripheral device shown in FIG. 5.

FIG. 6 is a state diagram which better illustrates the operation of peripheral device 182 shown in FIG. 5. A number of the states are similar to those shown in FIG. 4, and are similarly numbered. Therefore, controller 184 first begins the initialization routine at state 170. Controller 184 also waits, after power-up, for a predetermined time period in order to accommodate for contact bounce. This is indicated by state 172. After the desired delay, controller 184 enters indeterminate state 200.

Controller 184 (and specifically pull-up control component 186) then performs a USB attach operation by enabling pull-up resistor 150. In other words, control component 186 provides an output to bi-polar transistor 192 which effectively connects pull-up resistor 150 to VCC. It will be noted that this does not effect PS2 operation since, where a PS2 interface is provided, adapter 154 is already in place which includes its own pull-up resistor 166 on signal line 160. Controller 184 then senses the logic level on both signal lines 158 and 160 with a level detector such as that set out in co-pending U.S. patent application Ser. No. 09/112,171, filed Jul. 8, 1998 entitled "METHOD AND APPARATUS FOR DETECTING THE TYPE OF INTERFACE TO WHICH A PERIPHERAL DEVICE IS CONNECTED", which is hereby fully incorporated by reference.

As with the detection routine illustrated in FIG. 4, if controller 184 detects a SE1 condition, and that condition exists for a predetermined amount of time (such as three milliseconds), controller 184 determines that it has detected a PS2 interface. This is indicated by states 178 and 180.

However, if an SE1 condition is not detected but an SE0 or K state is detected, controller 184 remains in indeterminate state 200 and simply waits for this condition to change. This is because no determination can be made while the signal lines 158 and 160 are in the SE0 or K state.

If, on the other hand, while controller 184 is in indeterminate state 200, it detects a J state, it moves to state 202 and determines whether the J state exists for a predetermined time period (such as one millisecond). If the J state is not present for the desired amount of time, control shifts back to the indeterminate state 200.

However, if the J state does exist for the predetermined amount of time, controller 184 switches to state 204 where it performs a sequence of two USB detach operations. Each of these operations is approximately 100 microseconds in duration. The 100 microsecond detach operations are illustratively separated by approximately a 20 millisecond USB attach operation. The state (or logic level) of signal lines 158 and 160 is sensed at the end of each operation, and the sequence is ended by performing a USB device attach operation.

If this sequence results in all logic ones being sensed on signal lines 158 and 160, then controller 184 determines that it is connected to a PS2 interface and moves to state 180. However, if this sequence results in signal lines 158 and 160 being at a logic one after the USB attach operations are performed and at a logic 0 after the two USB detach operations are performed, then controller 184 determines that it is connected to a USB interface and moves to state 176. If neither of the patterns (all ones or alternating ones and zeros) is found at state 204, control again reverts to the indeterminate state 200.

In one illustrative embodiment, the state transitions in the state diagram are configured to occur on a 1024 microsecond timer interrupt. However, other timing can be used as well. Similarly, it should be noted that the time periods discussed with respect to FIGS. 4 and 6 are illustrative only and can be varied within the context of the present invention.

Although the present invention has been described with reference to preferred embodiments, workers skilled in the art will recognize that changes may be made in form and detail without departing from the spirit and scope of the invention.

What is claimed is:

1. A peripheral device connectable to a computer having one of a first interface and a second interface, the first interface communicating with the peripheral device over a differential data connection including a first data conductor and a second data conductor, and the second interface communicating with the peripheral device over a single ended data connection, including a first data conductor, and a clock conductor, the peripheral device comprising:

first and second communication conductors configured for connection to the first and second data conductors in the differential data connection when the computer includes the first interface, and configured for connection to the first data conductor in the single ended data connection and the clock conductor when the computer includes the second interface;

a connection element connecting a predetermined one of the first and second communication conductors to a voltage potential;

an interface detection component, coupled to the first and second communication conductors, configured to detect which of the first and second interfaces the peripheral device is connected to and to provide a connection output indicative of the detected interface; and a controller component, coupled to the interface detection component, configured to communicate between the peripheral device and the computer over the first and second communication conductors according to a protocol corresponding to the detected interface based on the connection output.

2. The peripheral device of claim 1 wherein the connection element comprises:

a resistive element connected between the predetermined communication conductor and the voltage potential.

3. The peripheral device of claim 2 wherein the resistive element is directly connected to the predetermined communication conductor and the voltage potential.

4. The peripheral device of claim 3 wherein the interface detection component is configured to sense signal levels on the first and second communication conductors and determine that the detected interface is the first interface upon sensing any valid communication corresponding to the first interface.

5. The peripheral device of claim 4 wherein the interface detection component is configured to sense a predetermined signal state on the first and second communication conductors and determine that the detected interface is the second interface.

6. The peripheral device of claim 5 wherein the predetermined signal state comprises a logical high level on the first and second communication conductors lasting for a predetermined time period.

7. The peripheral device of claim 2 wherein the connection element further comprises:

a switchable element selectively connecting the resistive element to the voltage potential.

8. The peripheral device of claim 7 wherein the switchable element comprises:

a bipolar transistor.

9. The peripheral device of claim 7 wherein the interface detection component comprises:

a switch controller, coupled to the switchable element, selectively connecting the resistive element to the voltage element.

10. The peripheral device of claim 9 wherein the switch controller is configured to connect the resistive element to the voltage potential and wherein the interface detection component is configured to sense signal levels on the first and second communication conductors and determine the detected interface based on the sensed signal levels.

11. The peripheral device of claim 10 wherein the interface detection component is configured to sense a first predetermined signal state on the first and second communication conductors and, if the first predetermined signal state lasts for a predetermined time period, connect and disconnect the resistive element to the voltage potential according to a preselected sequence and sense the signal levels during the preselected sequence.

12. The peripheral device of claim 11 wherein the interface detection component is configured to determine that the interface is the first interface if the signal levels, sensed during the preselected sequence, exhibit a first pattern associated with the first interface.

13. The peripheral device of claim 12 wherein the interface detection component is configured to determine that the interface is the second interface if the signal levels, sensed during the preselected sequence, exhibit a second pattern associated with the second interface.

14. The peripheral device of claim 10 wherein the interface detection component is configured to sense a second predetermined signal state, corresponding to the second interface, on the first and second communication conductors and, if the second predetermined signal state lasts for a predetermined time period, determining that the interface is the second interface.

15. The peripheral device of claim 1 and further comprising:
an adapter, disconnectably connected to the first and second communication conductors, including first and second resistive elements connecting the first and second communication conductors, respectively, to the voltage potential.

16. A method implemented by a peripheral device for detecting whether the peripheral device is connected to a first interface or a second interface in a computer, the first interface communicating with the peripheral device over a differential data connection including a first data conductor and a second data conductor, and the second interface communicating with the peripheral device over a single ended data connection, including a first data conductor, and a clock conductor, the peripheral device including first and second communication conductors configured for connection to the first and second data conductors in the differential data connection when the computer includes the first interface, and configured for connection to the first data conductor in the single ended data connection and the clock conductor when the computer includes the second interface, the method comprising:
sensing signal levels on the first and second communication conductors; and
detecting which of the first and second interfaces the peripheral device is connected to based on the sensed signal levels.

17. The method of claim 16 wherein sensing signal levels comprises:
sensing any valid communication associated with the first interface and wherein detecting comprises detecting the first interface upon sensing the valid communication.

18. The method of claim 16 wherein sensing signal levels comprises:
sensing a predetermined signal state, associated with the second interface, on the first and second communication conductors; and
if so, detecting comprises detecting the second interface.

19. The method of claim 18 wherein sensing a predetermined signal state comprises:
sensing logic high levels on the first and second communication conductors; and
determining whether the predetermined signal state lasts for a predetermined time period.

20. The method of claim 16 wherein sensing comprises:
sensing a predetermined signal state;
determining whether the predetermined signal state lasts for a predetermined time period;
if so, selectively attaching one of the first and second communication conductors to a predetermined voltage potential according to a preselected sequence.

21. The method of claim 20 wherein sensing comprises:
sensing signal levels during the preselected sequence; and
wherein detecting comprises detecting the first interface when the sensed signal levels exhibit a pattern corresponding to the first interface and detecting the second interface when the sensed signal levels exhibit a pattern corresponding to the second interface.

22. The method of claim 20 wherein selectively attaching comprises:
selectively energizing a bipolar transistor connected between one of the first and second communication conductors and the predetermined voltage potential.

23. A method implemented in a peripheral device of detecting whether the peripheral device is connected to a Universal Serial Bus (USB) interface or a PS2 interface, the peripheral device including first and second communication conductors, the method comprising:
sensing signal levels on the first and second communication conductors; and
detecting which of the USB and PS2 interfaces the peripheral device is connected to based on the sensed signal levels.

24. The method of claim 23 wherein sensing signal levels comprises:
sensing any valid USB communication and wherein detecting comprises detecting the USB interface upon sensing the valid communication.

25. The method of claim 23 wherein sensing signal levels comprises:
sensing a predetermined signal state, associated with the PS2 interface, on the first and second communication conductors; and
if so, detecting comprises detecting the PS2 interface.

26. The method of claim 25 wherein sensing a predetermined signal state comprises:
sensing logic high levels on the first and second communication conductors; and
determining whether the predetermined signal state lasts for a predetermined time period.

27. The method of claim 23 wherein sensing comprises:
sensing a predetermined signal state;
determining whether the predetermined signal state lasts for a predetermined time period;
if so, selectively attaching one of the first and second communication conductors to a predetermined voltage potential according to a preselected sequence.

28. The method of claim 27 wherein sensing comprises:
sensing signal levels during the preselected sequence; and
wherein detecting comprises detecting the USB interface when the sensed signal levels exhibit a pattern corresponding to the USB interface and detecting the PS2 interface when the sensed signal levels exhibit a pattern corresponding to the PS2 interface.

29. The method of claim 27 wherein selectively attaching comprises:
selectively energizing a bipolar transistor connected between one of the first and second communication conductors and the predetermined voltage potential.

30. A peripheral device connectable to a computer having one of a first interface and a second interface, the first interface communicating with the peripheral device over a differential data connection including a first data conductor and a second data conductor, and the second interface communicating with the peripheral device over a single ended data connection, including a first data conductor, and a clock conductor, the peripheral device comprising:
first and second communication conductors configured for connection to the first and second data conductors in the differential data connection when the computer includes the first interface, and configured for connection to the first data conductor in the single ended data connection and the clock conductor when the computer includes the second interface;
an interface detection component, coupled to at least one of the first and second communication conductors, configured to monitor at least one of the first and second communication conductors to detect which of the first and second interfaces the peripheral device is connected to; and a controller component, coupled to the interface detection component, configured to communicate between the peripheral device and the computer over the first and second communication conductors according to a protocol corresponding to the detected interface.

31. A computer readable medium for use in a peripheral device connectable to a computer, the computer having one of a first interface and a second interface, the first interface communicating with the peripheral device over a differential data connection including a first data conductor and a second data conductor, and the second interface communicating with the peripheral device over a single ended data connection, including a first data conductor, and a clock conductor, the peripheral device including first and second communication conductors configured for connection to the first and second data conductors in the differential data connection when the computer includes the first interface, and configured for connection to the first data conductor in the single ended data connection and the clock conductor when the computer includes the second interface, the computer readable medium including instructions stored thereon which when executed by the peripheral device causes the peripheral device to execute the steps of:

detecting which of the first and second interfaces the peripheral device is connected to based on signal levels on at least one of the first and second communication conductors; and communicating with the computer over the first and second communication conductors according to a protocol corresponding to the detected interface.

32. A peripheral device connectable to a computer having one of a first interface and a second interface, the first interface communicating with the peripheral device over a differential data connection including a first data conductor and a second data conductor, and the second interface communicating with the peripheral device over a single ended data connection, including a first data conductor, and a clock conductor, the peripheral device comprising:

first and second communication conductors configured for connection to the first and second data conductors in the differential data connection when the computer includes the first interface, and configured for connection to the clock conductor and the first data conductor in the single ended data connection when the computer includes the second interface;

an interface detection component, coupled to at least one of the first and second communication conductors, configured to detect which of the first and second interfaces the peripheral device is connected to by detecting a signal level on at least one of the first and second communication conductors and to provide a connection output indicative of the detected interface; and a controller component, coupled to the interface detection component, configured to communicate between the peripheral device and the computer over the first and second communication conductors according to a protocol corresponding to the detected interface based on the connection output.

33. A computer readable medium for use in a peripheral device connectable to a computer, the computer having one of a first interface and a second interface, the first interface communicating with the peripheral device over a differential data connection including a first data conductor and a second data conductor, and the second interface communicating with the peripheral device over a single ended data connection, including a first data conductor, and a clock conductor, the peripheral device including first and second communication conductors configured for connection to the first and second data conductors in the differential data connection when the computer includes the first interface, and configured for connection to the clock conductor and the first data conductor in the single ended data connection when the computer includes the second interface, the computer readable medium including instructions stored thereon which when executed by the peripheral device causes the peripheral device to execute the steps of:

detecting which of the first and second interfaces the peripheral device is connected to by monitoring a state of at least one of the first and second communication conductors; and communicating with the computer over the first and second communication conductors according to a protocol corresponding to the detected interface.

* * * * *